April 21, 1925.                                                    1,534,694
B. M. DESKINS ET AL
COMBINED WASTE COCK AND CUT-OFF FOR WATER PIPES
Filed May 14, 1924

Inventor

B. M. Deskins.
K. F. Deskins.

By Lacy & Lacy, Attorneys

Patented Apr. 21, 1925.

1,534,694

UNITED STATES PATENT OFFICE.

BALLARD M. DESKINS, OF WAVERLY, OHIO, AND KENNIS F. DESKINS, OF LOGAN, WEST VIRGINIA.

COMBINED WASTE COCK AND CUT-OFF FOR WATER PIPES.

Application filed May 14, 1924. Serial No. 713,266.

*To all whom it may concern:*

Be it known that we, BALLARD M. DESKINS and KENNIS F. DESKINS, citizens of the United States, residing at Waverly, in the county of Pike and State of Ohio, and Logan, in the county of Logan and State of West Virginia, respectively, have invented certain new and useful Improvements in Combined Waste Cocks and Cut-Offs for Water Pipes, of which the following is a specification.

Our invention relates to a device forming a union adapted to be inserted in any suitable place in a water supply pipe.

The object of the invention is to provide such a device with a cock for connecting the main line with a fire plug or hose and at the same time cutting off the main line supply beyond said cock.

One embodiment of the invention is illustrated in the accompanying drawing, and

Figure 1:
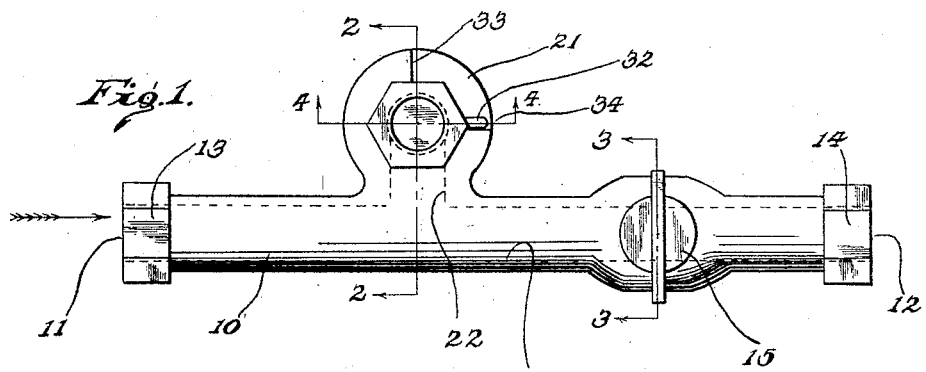
Figure 1 is a top plan view of the device.

In the drawing, reference numeral 10 represents a union adapted to be inserted in any desired position in a main water line and is for this reason provided with ends 11 and 12 threaded internally to fit the pipe line. The union has hexagonal or square heads 13 and 14 at its ends for screwing it on the main pipe.

Figure 2:
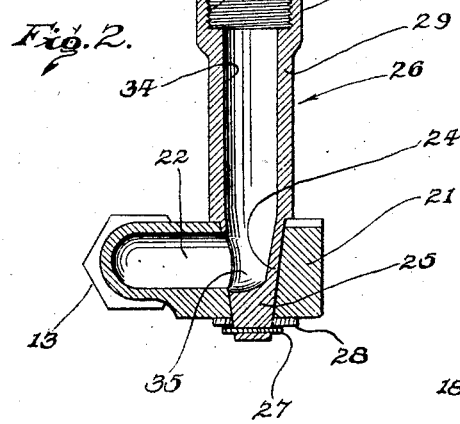
Figure 2 is a vertical section along line 2—2 of Figure 1.

Near one end of the union is provided a stop cock 15 fitting in a tapering socket 16 in the union and provided with a transverse aperture 17 permitting the passage of water through the union when said aperture stands lengthwise in the union and shutting off the water entirely beyond the union when the aperture is turned transversely thereto as indicated in Figures 1 and 2. The stop cock 15 has a thin head 18 at its upper end and is retained in position in the socket by means of a pin 19 and a washer 20.

Between the stop cock 15 and the head 13 of the union is provided a side projection 21 connected by means of a branch 22 with the main bore 23 of the union. This branch 22 opens into a downwardly tapered socket 24 extending in vertical direction through the projection 21 and is adapted to receive the correspondingly tapered shank 25 of a waste cock 26 held in position in the socket by means of a cotter pin 27 and a washer 28, in the usual manner. This waste cock has a tubular extension 29 terminating in a square or hexagonal head 30 provided with internal threads 31. In this manner it is possible to connect the waste cock with a hose, fire plug, or spigot, as conditions may require.

The waste cock 26 has a small stud 32 projecting in a radial direction therefrom and adapted to engage respectively with shoulders 33 and 34 on the top face of the projection 21. This permits only a quarter turn of the waste cock 26. With the parts in the relative position shown in Figures 1, 2 and 3, the waste cock stands open, that is to say, its bore 34 communicates by means of a side opening 35 at the lower end thereof with the branch 22 and the bore 23 of the union.

Figure 3:
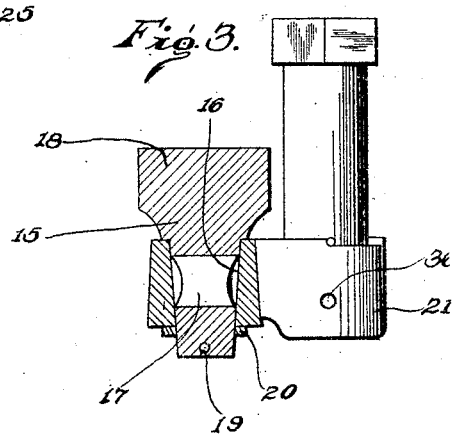
Figure 3 is a section along line 3—3 of Figure 1.
Figure 4:
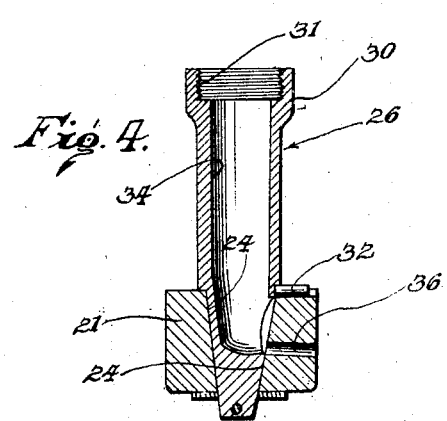
Figure 4 is a similar section along line 4—4 of Figure 1.

On one side of the projection 21 is provided a small vent 36 leading into the tapered socket 24, as best seen in Figures 3 and 4, this vent being intended to drain any water remaining in the bore of the waste cock when it is turned into closed position, as seen in Figure 4, and thus prevent freezing.

If the water line is required to be connected with a hose, fire plug, or the like, the waste cock 26 is turned into the position shown in Figure 2 so that the bore 34 of the waste cock 26 connects with the waste main bore 23 of the union, the fire plug or hose being suitably connected to the threaded portion 31 of the cock. At the same time the cut-off cock 15 is turned as indicated in Figures 1 and 3 so that no water can pass this cock and the full pressure is received through the bore 34 of the waste cock 26.

When water is required to flow within the main line, the cock 26 is turned as indicated in Figure 4 so as to close the branch 22. The water will then flow by the cock 26 and when the cut-off cock 15 is turned 90° from the position shown in Figures 1 and 3, the water will then have free passage through the union and into the pipe line beyond the same.

Having thus described the invention, what is claimed as new is:

1. In a union for a pipe line, a cut-off cock in said union, and a projection on said union provided with a socket for a waste cock, the bore of the union having a branch connection with said socket whereby upon said waste cock being turned into open position and the cut-off cock into closed position, water will flow through said branch and out through said waste cock instead of along the pipe line beyond said cut-off cock.

2. In a union for a pipe line, a cut-off cock in said union, a projection on said union provided with a socket for a waste cock, the bore of the union having a branch connection with said socket, and means for limiting the turning of said waste cock whereby, upon said waste cock being turned into open position and the cut-off cock into closed position, water will flow through said branch and out through said waste cock instead of along the pipe line beyond said cut-off cock.

3. In a union for a pipe line, a cut-off cock in said union, a projection on said union provided with a socket for a waste cock, the bore of the union having a branch connection with said socket, and means for limiting the turning of said waste cock, said waste cock comprising a tubular member having a head provided with internal threads and an axial bore adapted to communicate with said branch in the union when said waste cock stands in open position; whereby upon said waste cock being turned into open position and the cut-off cock into closed position, water will flow through said branch and out through said waste cock instead of along the pipe line beyond said cut-off cock.

4. In a union for a pipe line, a cut-off cock in said union, a projection on said union provided with a socket for a waste cock, the bore of the union having a branch connection with said socket, means for limiting the turning of said waste cock, said waste cock comprising a tubular member having a head provided with internal threads and an axial bore adapted to communicate with said branch in the union when said waste cock stands in open position, a drain vent being provided in said projection connecting with the bore of the waste cock when turned into closed position; whereby, upon said waste cock being turned into open position and the cut-off cock into closed position, water will flow through said branch and out through said waste cock instead of along the pipe line beyond said cut-off cock.

5. In a union for a pipe line, a cut-off cock in said union, a projection on said union provided with a socket for a waste cock, the bore of the union having a branch connection with said socket, means for limiting the turning of said waste cock to about a quarter turn, said waste cock comprising a tubular member having a flat sided head provided with internal threads and an axial bore adapted to communicate with said branch in the union when said waste cock stands in open position, a drain vent being provided in said projection connecting with the bore of the waste cock when turned into closed position, said means including a stud on said tubular member, and shoulders formed on said projection; whereby, upon said waste cock being turned into open position and the cut-off cock into closed position, water will flow through said branch and out through said waste cock instead of along the pipe line beyond said cut-off cock.

6. In a union for pipe lines, a cut-off cock, and a waste cock carried by the union and communicating with the bore thereof whereby when the waste cock is moved to open position and the cut-off cock to closed position, water will flow through said waste cock instead of flowing through the pipe line and beyond said cut-off cock.

In testimony whereof we affix our signatures.

BALLARD M. DESKINS. [L. S.]
KENNIS F. DESKINS. [L. S.]